United States Patent
Kimura

(10) Patent No.: US 12,256,050 B2
(45) Date of Patent: Mar. 18, 2025

(54) IMAGE PROCESSING APPARATUS, IMAGE PROCESSING METHOD, STORAGE MEDIUM, MANUFACTURING METHOD OF LEARNED MODEL, AND IMAGE PROCESSING SYSTEM

(71) Applicant: CANON KABUSHIKI KAISHA, Tokyo (JP)

(72) Inventor: Yoshinori Kimura, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 208 days.

(21) Appl. No.: 17/342,715

(22) Filed: Jun. 9, 2021

(65) Prior Publication Data

US 2021/0392313 A1     Dec. 16, 2021

(30) Foreign Application Priority Data

Jun. 16, 2020    (JP) ................................ 2020-103809

(51) Int. Cl.
     *H04N 13/111*      (2018.01)
     *G06N 3/045*      (2023.01)
     *G06N 3/08*      (2023.01)
     *G06T 7/00*      (2017.01)
     *H04N 13/282*      (2018.01)

(52) U.S. Cl.
     CPC ........... *H04N 13/111* (2018.05); *G06N 3/045* (2023.01); *G06N 3/08* (2013.01); *G06T 7/97* (2017.01); *H04N 13/282* (2018.05); *G06T 2207/20081* (2013.01); *G06T 2207/20084* (2013.01)

(58) Field of Classification Search
     USPC ........................................................ 348/42
     See application file for complete search history.

(56) References Cited

U.S. PATENT DOCUMENTS

| | | | | |
|---|---|---|---|---|
| 2014/0079297 A1* | 3/2014 | Tadayon | ............. | G06V 40/172 382/118 |
| 2014/0098191 A1* | 4/2014 | Rime | .................... | H04N 23/64 348/E5.022 |
| 2019/0244379 A1 | 8/2019 | Venkataraman | | |

(Continued)

FOREIGN PATENT DOCUMENTS

| | | |
|---|---|---|
| CN | 104012088 A | 8/2014 |
| CN | 107729948 A | 2/2018 |
| CN | 108364310 A | 8/2018 |

(Continued)

OTHER PUBLICATIONS

Kalantari. "Learning-Based View Synthesis for Light Field Cameras." SIGGRAPH Asia. 2016. 10 pages.

(Continued)

*Primary Examiner* — Mikhail Itskovich
(74) *Attorney, Agent, or Firm* — ROSSI, KIMMS & McDOWELL LLP

(57) ABSTRACT

An image processing apparatus includes at least one processor or circuit configured to execute a plurality of tasks including an acquisition task configured to acquire two first images made by capturing the same object at two different viewpoints, and an image processing task configured to input the two first images into a machine learning model and to estimate a second image at one or more viewpoints different from the two viewpoints.

7 Claims, 11 Drawing Sheets

(56) References Cited

U.S. PATENT DOCUMENTS

2020/0013154 A1    1/2020  Jang
2020/0134366 A1*   4/2020  Xu .......................... G06V 10/82

FOREIGN PATENT DOCUMENTS

| CN | 109214265 A  | 1/2019  |
|----|--------------|---------|
| CN | 109561296 A  | 4/2019  |
| CN | 109978936 A  | 7/2019  |
| CN | 110351548 A  | 10/2019 |
| CN | 110443874 A  | 11/2019 |
| CN | 111247559 A  | 6/2020  |
| JP | 2018124939 A | 8/2018  |

OTHER PUBLICATIONS

Office Action issued in Chinese Appln. No. 202110665990.0, mailed Sep. 4, 2023. English translation provided.

Office Action issued in Chinese Appln. No. 202110665990.0 mailed Mar. 19, 2024. English translation provided.

Schiopu et al. "Frame-Wise CNN-Based View Synthesis for Light Field Camera Arrays" IEEE. 2019. pp. 1-7.

* cited by examiner

IMAGE PROCESSING APPARATUS, IMAGE PROCESSING METHOD, STORAGE MEDIUM, MANUFACTURING METHOD OF LEARNED MODEL, AND IMAGE PROCESSING SYSTEM

BACKGROUND OF THE INVENTION

Field of the Invention

The present invention relates to an image processing method that estimates another viewpoint image from two-viewpoint images using machine learning or deep learning (DL).

Description of the Related Art

N. K. Kalantari, T-C. Wang, R. M. Ramamoorthi, "Learning-Based View Synthesis for Light Field Camera," SIGGRAPH Asia (2016) ("Kalantari et al.") discloses a method of estimating another viewpoint image from four-viewpoint images using DL. The four-viewpoint images are images made by capturing the same object at four different viewpoints, and the other viewpoint image is an image as if it is made by capturing the same object at one or more viewpoints different from the four viewpoints.

When the other viewpoint image is estimated from two-viewpoint images with a disparity (parallax) in a lateral direction using the method disclosed in Kalantari et al., the estimation accuracy of the rectangular-shaped object in the two-viewpoint images is lowered. This is because it is so difficult to find corresponding points of the rectangular-shaped object between the two-viewpoint images that a depth from the camera to the rectangular-shaped object cannot be determined.

SUMMARY OF THE INVENTION

The present invention provides an image processing apparatus that can estimate another viewpoint image from two-viewpoint images with high accuracy.

An image processing apparatus according to one aspect of the present invention includes at least one processor or circuit configured to execute a plurality of tasks including an acquisition task configured to acquire two first images made by capturing the same object at two different viewpoints, and an image processing task configured to input the two first images into a machine learning model and to estimate a second image at one or more viewpoints different from the two viewpoints. An image processing method corresponding to the above image processing apparatus also constitutes another aspect of the present invention. A non-transitory computer-readable storage medium storing a computer program that causes a computer to execute the image processing method also constitutes another aspect of the present invention.

An image processing apparatus according to another aspect of the present invention includes at least one processor or circuit configured to execute a plurality of tasks including an image generating task configured to generate two first images made by capturing the same object at two different viewpoints and a second image at one or more viewpoints different from the two viewpoints, and a learning task configured to input the two first images into a machine learning model, to compare an output image and the second image with each other, and to learn the machine learning model. An image processing method and a method of manufacturing a learned model each corresponding to the above image processing apparatus also constitutes another aspect of the present invention. A non-transitory computer-readable storage medium storing a computer program that causes a computer to execute the image processing method also constitutes another aspect of the present invention.

An image processing system according to another aspect of the present invention includes a first device and a second device communicable with the first device, the image processing system. The first device includes a transmitter configured to transmit a request that requests the second device to process two first images made by capturing the same object at two different viewpoints. The second device includes a receiver configured to receive the request transmitted from the transmitter, and at least one processor or circuit configured to execute a plurality of tasks including an image processing task configured to input the two first images into a machine learning model and to estimate a second image at one or more viewpoints different from the two viewpoints.

Further features of the present invention will become apparent from the following description of exemplary embodiments with reference to the attached drawings.

DESCRIPTION OF THE EMBODIMENTS

Figure 1:
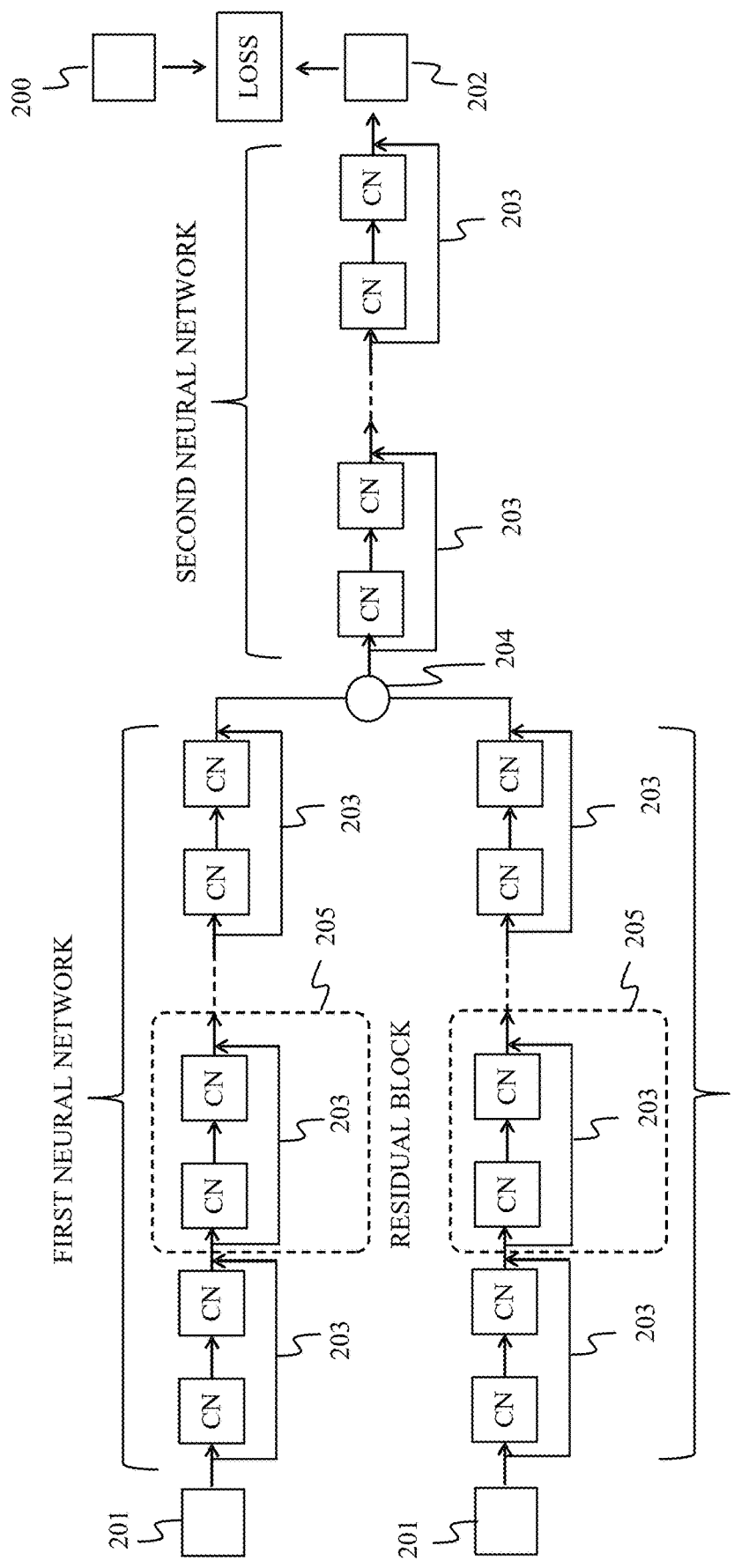
FIG. 1 illustrates a learning flow of a machine learning model in each embodiment.

Referring now to the accompanying drawings, a detailed description will be given of embodiments according to the present invention. Corresponding elements in respective figures will be designated by the same reference numerals, and a duplicate description thereof will be omitted.

A description will now be given of a gist of each embodiment before a specific description is given. In each embodiment, in estimating another viewpoint image from two-viewpoint images with a disparity in a lateral direction using DL, another viewpoint image is robustly estimated of a rectangular-shaped object in the two-viewpoint images.

A neural network is used for image processing by DL. The neural network uses a filter to be convolved with an image, a bias added to it, and an activation function that performs a nonlinear transformation. The filter and bias are called weights and generated by learning from training images. The present invention uses two-viewpoint images and another viewpoint image corresponding to them as the training image. Alternatively, a parametric activation function may be used to simultaneously generate the parameters by learning.

A multidimensional array obtained in an intermediate layer in the neural network as a result of repeating processing of convolving the filter with the image, of adding the bias to the image, and of performing the nonlinear transformation for the image is called a feature map. One point of the feature map obtained by convolving a plurality of filters with the image many times includes information on a corresponding wide area (receptive field) in the image.

Figure 10:
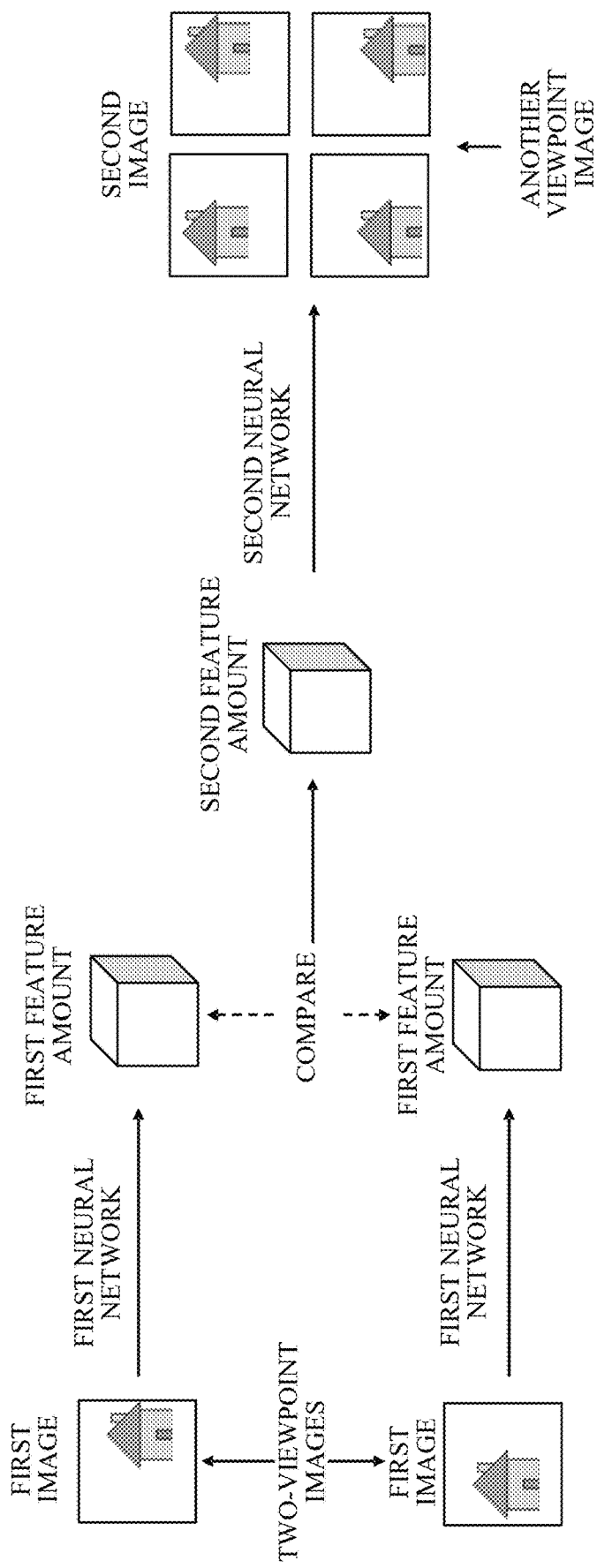
FIG. 10 explains an outline in each embodiment.

Referring now to FIG. 10, a description will be given of an outline of each embodiment. Each embodiment first generates two feature maps (first feature amounts) of the two-viewpoint images (first images) from the two viewpoint images using a first neural network. Next, each embodiment compares the two generated feature maps with each other, and extracts information (second feature amount) on corresponding points between the two-viewpoint images. Here, the information on the corresponding points between the two-viewpoint images is information used to find a shift amount according to a depth (distance) of the same object in the two-viewpoint image. Finally, another viewpoint image (second image) is estimated by a second neural network from the information (second feature amount) on the corresponding points between the two viewpoint images.

Each embodiment characteristically finds the corresponding points by comparing the two feature maps obtained from the two-viewpoint images. This makes it easier to find the corresponding points of the rectangular-shaped object than the prior art that compares the two-viewpoint images for each pixel. This is because even for the rectangular-shaped object, a clue of the corresponding points (edges of the rectangular-shaped object and the texture of the surface of the rectangular-shaped object) can be found when it is viewed in a wide area. As a result, each embodiment can robustly estimate the other viewpoint image of a rectangular-shaped object in the two-viewpoint images having a disparity in the lateral direction.

A description will now be given of finding the corresponding points between the two-viewpoint images using template matching. A larger template might be able to find the corresponding points of the rectangular-shaped object between the two-viewpoint images. However, this is not realistic because the larger the template is, the heavier the computational load becomes. Each embodiment using the feature map can expand the receptive field only by deepening the network, and search for the corresponding points in a wider area in the two-viewpoint images. As a result, it becomes easy to find the corresponding points of the rectangular-shaped object between the two-viewpoint images.

In general, the two-viewpoint images with a disparity in the lateral (or horizontal) direction have no disparity information in the longitudinal (or vertical) direction. It is therefore difficult to estimate, based on the two-viewpoint images, an image at a viewpoint that shifts in the longitudinal direction (a direction orthogonal to or different from the predetermined direction) rather than the lateral direction (predetermined direction) determined by the two viewpoints. However, each embodiment can estimate the distance from the camera to the object with high accuracy by comparing the two feature maps obtained from the two viewpoint images and by finding the corresponding points. Estimating the disparity information in the longitudinal direction from the result, each embodiment can estimate, based on the two-viewpoint images, an image at a viewpoint that shifts in the longitudinal direction rather than the lateral direction determined by the two viewpoints.

The above image processing method is merely illustrative, and each embodiment is not limited to this example. Details of other image processing methods and the like will be described in each of the following embodiment. Each embodiment is not limited to a case where the two viewpoints of the two-viewpoint images shift in the lateral direction, but is applicable to an image in which the viewpoints shift in an arbitrary direction (predetermined direction).

First Embodiment

A description will now be given of an image processing system according to a first embodiment of the present invention. This embodiment provides learning and execution of image processing for estimating another viewpoint image from two-viewpoint images using a neural network.

Figure 2:
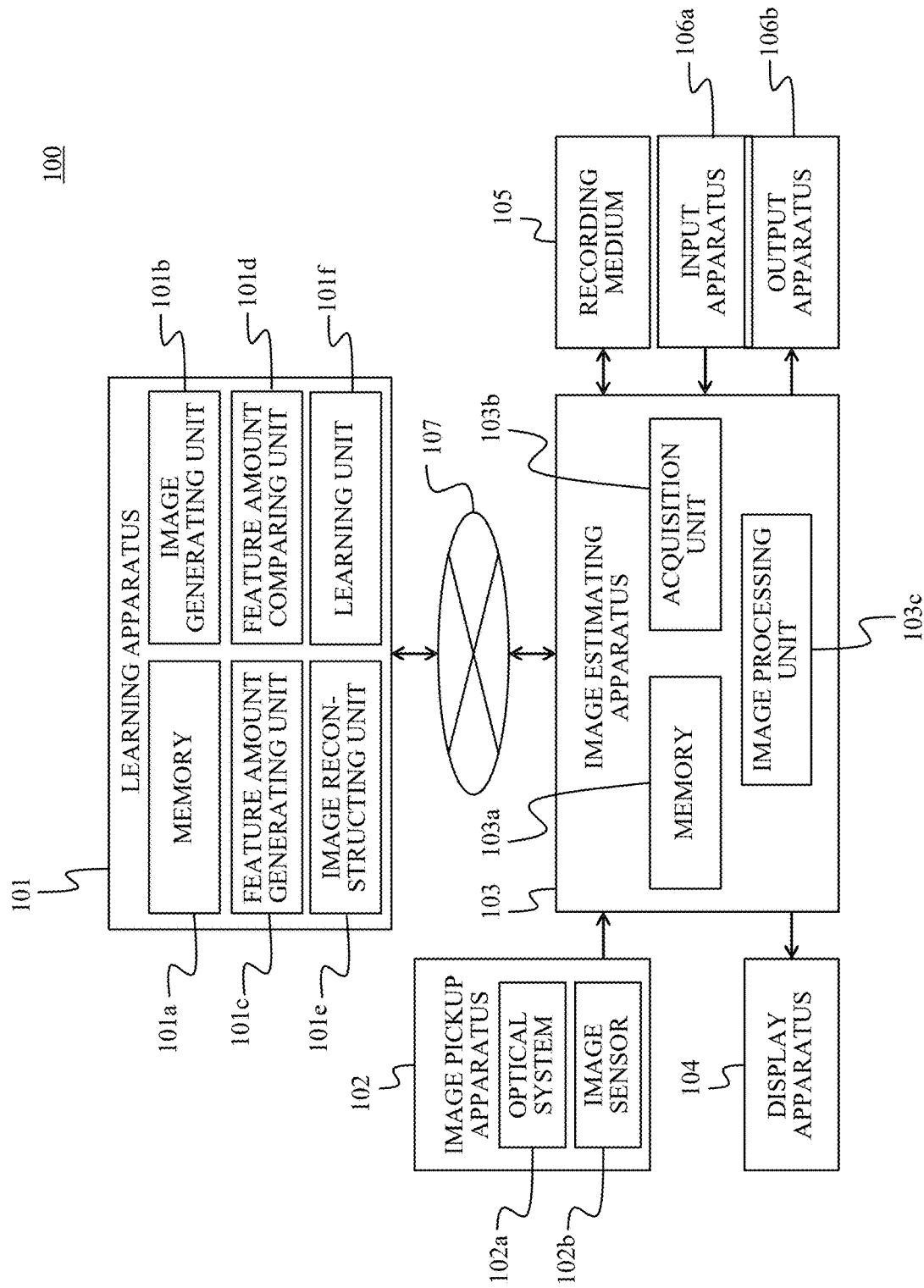
FIG. 2 is a block diagram of an image processing system according to a first embodiment.
Figure 3:
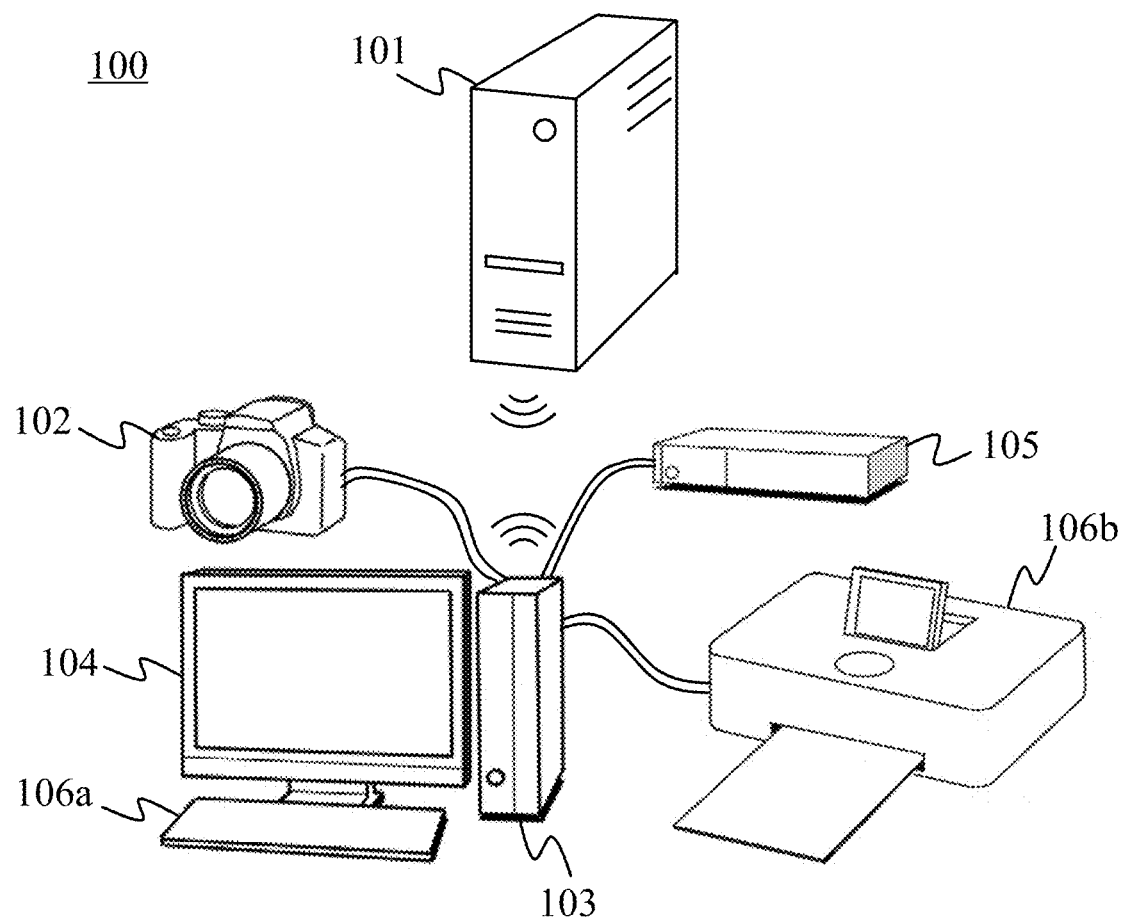
FIG. 3 is an external view of the image processing system according to the first embodiment.

FIG. 2 is a block diagram of the image processing system 100 according to this embodiment. FIG. 3 is an external view of the image processing system 100. The image processing system 100 includes a learning apparatus 101, an image pickup apparatus 102, an image estimating apparatus 103, a display apparatus 104, a recording medium 105, an output apparatus 106b, and a network 107.

The learning apparatus (image processing apparatus) 101 includes a memory 101a, an image generating unit 101b, a feature amount generating unit 101c, a feature amount comparing unit 101d, an image reconstructing unit 101e, and a learning unit 101f.

The image pickup apparatus 102 includes an optical system (imaging optical system) 102a and an image sensor 102b. The optical system 102a collects light incident on the image pickup apparatus 102 from an object space. A captured image (two-viewpoint image) is acquired by receiving an optical image of an object formed via the optical system 102a. The image sensor 102b is an image-plane phase detection sensor. Here, the image-plane phase detection sensor is an image sensor in which one pixel includes a single microlens and a plurality of photoelectric conversion elements (photodiodes, etc.), and can acquire a plurality of viewpoint images at the same time because light beams that have passed through different pupil areas of the imaging optical system is recorded by the photoelectric conversion element. The present invention uses an image sensor in which one pixel includes two independent photoelectric conversion elements on the left and right sides. This structure can simultaneously provide two-viewpoint images in which the same object is viewed with the right eye and the left eye. The image pickup apparatus 102 provided with the image-plane phase detection sensor is mainly used to automatically focus (autofocus) on the object. The image pickup apparatus 102 according to this embodiment is not limited to this structure, and may be, for example, a stereo camera as long as it can acquire the two-viewpoint images. In that case, the image sensor 102b is a CCD (Charge Coupled Device) sensor, a CMOS (Complementary Metal-Oxide Semiconductor) sensor, or the like. A memory for storing the acquired two-viewpoint images and a display unit for displaying the acquired two-viewpoint images, a transmitter for transmitting information to the outside, an output unit for storing the information in an external storage medium, a control unit for controlling each unit in the image pickup apparatus 102, and the like are not illustrated in FIGS. 2 and 3, respectively.

The image estimating apparatus (image processing apparatus) 103 has a memory 103a, an acquisition unit 103b, and an image processing unit (estimation unit) 103c. The image estimating apparatus 103 performs image processing for estimating another viewpoint image from the acquired two-viewpoint images. A neural network is used for the image processing, and weight information of the neural network is read out of the memory 103a. The weight has been learned by the learning apparatus 101, and the image estimating apparatus 103 reads the weight information out of the memory 101a in advance via the network 107 and stores the weight in the memory 103a. The weight information to be stored may be a weight value itself or may be in an encoded form. The details of weight learning and image processing using the weight will be described later.

The estimated other viewpoint image is output to at least one of the display apparatus 104, the recording medium 105, and the output apparatus 106b. The display apparatus 104 is, for example, a liquid crystal display or a projector. The user can perform editing work and the like while checking an image that is being processed via the display apparatus 104. The recording medium 105 is, for example, a semiconductor memory, a hard disk, a server on a network, or the like. The output apparatus 106b is a printer or the like. The image estimating apparatus 103 serves to perform image processing such as development processing and refocusing, if necessary. Refocusing is image processing that changes an in-focus position (focus position or focus plane) to the corresponding points by adding the multi-viewpoint images after shifting them relative to each other so as to overlap the corresponding points. That is, the image processing unit 103c can generate a third image (refocused image) in which the in-focus position has been changed from the estimated other viewpoint image.

Figure 4:
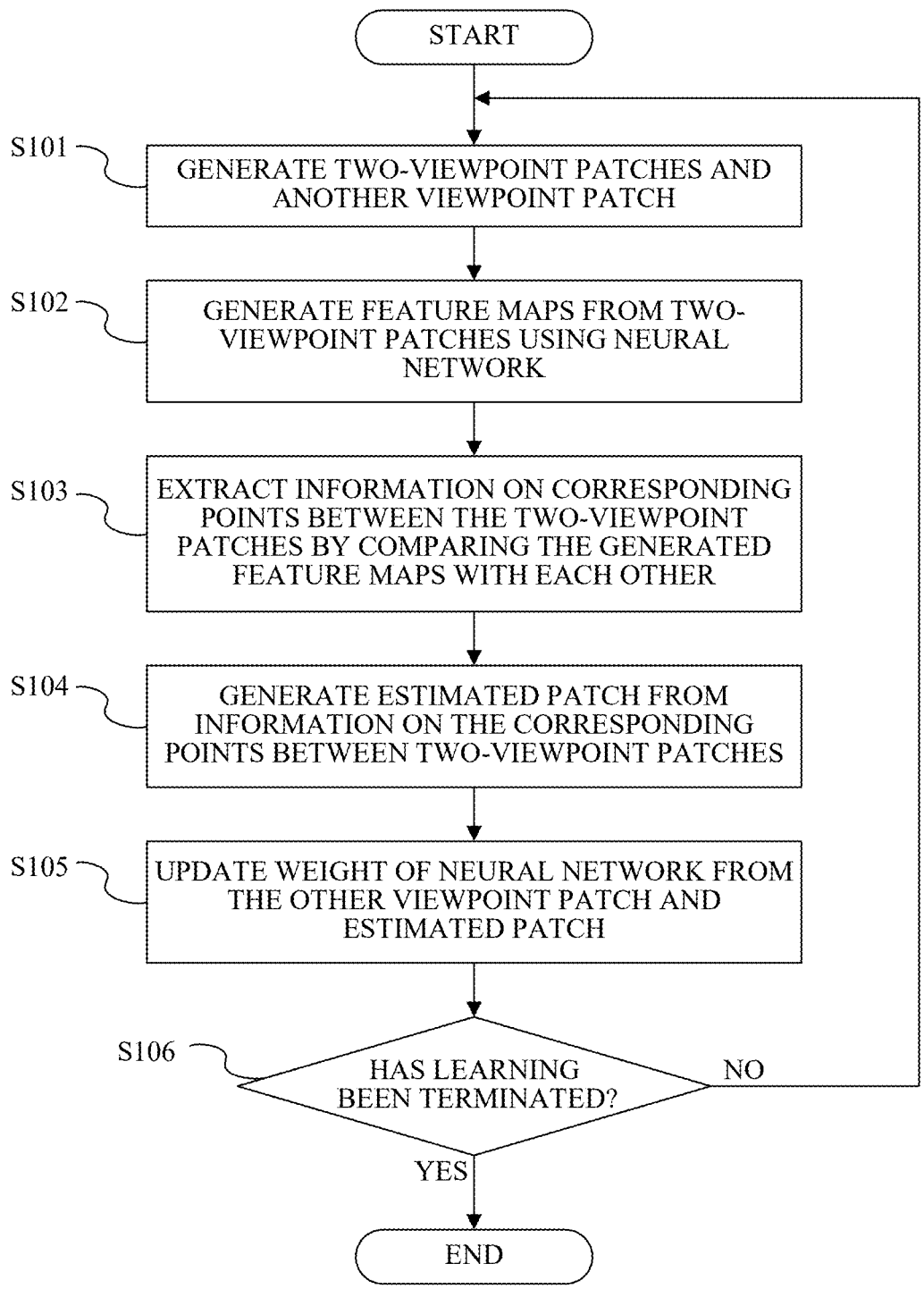
FIG. 4 is a flowchart relating to weight learning in each embodiment.

Referring now to FIGS. 1 and 4, a description will be given of a weight learning method (a method of manufacturing a learned model) executed by the learning apparatus 101 in this embodiment. FIG. 1 illustrates a flow of learning weights of a neural network (machine learning model). FIG. 4 is a flowchart relating to the weight learning. Each step in FIG. 4 is mainly executed by the image generating unit 101b, the feature amount generating unit 101c, the feature amount comparing unit 101d, the image reconstructing unit 101e, or the learning unit 101f.

First, in the step S101 in FIG. 4, the image generating unit 101b generates two-viewpoint patches (two first images) and corresponding, another viewpoint patch (at least one second image). In this embodiment, the two-viewpoint patches are image (first images) made by capturing the same object at two different viewpoints, and the other viewpoint patch is an image (second image) made by capturing the same object at one or more viewpoints different from the two viewpoints. The patch refers to an image having a predetermined number of pixels (such as 120×120 pixels). In this embodiment, the one or more viewpoints different from the two viewpoints include, but are not limited to, a viewpoint that shifts in a direction orthogonal to a direction determined by the two viewpoints, and may include a viewpoint that shifts in a direction different from the direction determined by the two viewpoints.

This embodiment acquires multi-viewpoint images by a light field camera, and generates two-viewpoint patches and another viewpoint patch from the multi-viewpoint images. For example, four-viewpoint images may be acquired by the light field camera, and corresponding two-viewpoint images acquired by a camera with the image-plane phase detection sensor may be generated from the acquired four-viewpoint images. The four-viewpoint images to the two-viewpoint images may be generated by interpolating the viewpoint images based on the relationship between the viewpoints. The relationship between the viewpoints is determined by the configuration of the light field camera sensor and the image-plane phase detection sensor.

However, this embodiment is not limited to this example, and the two-viewpoint patches and the corresponding, other viewpoint patch may be generated by numerical calculation. For example, the two-viewpoint patches and the corresponding other viewpoint patch may be generated by arranging an object and a camera in a three-dimensional space of 3DCG and by rendering a corresponding image captured by the camera.

Next, in the step S102, the feature amount generating unit 101c generates feature maps of the two-viewpoint patches (two first feature amounts) using the first neural network from the two-viewpoint patches (two first images). One first neural network is prepared for each of the two-viewpoint patches (exists for each of the two-viewpoint patches). In this embodiment, each first neural network to which the two-viewpoint patch is input has the same network architecture and weight. However, this embodiment is not limited to this example, and each first neural network into which the two-viewpoint patch is input may have a different network architecture and/or weight.

This embodiment inputs each of the two viewpoint patches to the first neural network, but the present invention is not limited to this example. For example, information on an imaging condition and a viewpoint of the estimated, other viewpoint patch may be input to the first neural network together with the two-viewpoint patches. Here, the imaging condition includes an aperture value (F-number) of the lens that has captured the two-viewpoint patches, a focal length, a distance from the camera to the in-focus object, and an ISO speed (sensor sensitivity), a shutter speed, a pixel pitch, and various filter characteristics, etc. of the sensor on the camera side.

One method of inputting information on the imaging condition and the viewpoint of the estimated, other viewpoint image into the neural network is, for example, a method of combine an image having a value corresponding to the F-number of the lens as a pixel value with the two-viewpoint patch and input the combination into the first neural network. Alternatively, a method may be used which inputs the value corresponding to the F-number of the lens into a third neural network, combines an image having the obtained value as the pixel value with the two-viewpoint patch, and inputs the combination into the first neural network. That is, the value corresponding to the F-number of the lens may not be input into the first neural network as it is, but may be input into it after the value is nonlinearly converted by the third neural network that is separately prepared. Further, instead of inputting the two-viewpoint patch directly into the first neural network, for example, an image made by interpolating and shifting the two-viewpoint patch by a subpixel in the lateral direction may be input.

Next, in the step S103, the feature amount comparing unit 101d compares two feature maps (two first feature amounts) with each other generated from the two-viewpoint patches (two first images), respectively, and extracts information on the corresponding points between the two-viewpoint patches (second feature amounts). In this embodiment, the feature amount comparing unit 101d calculates the corresponding points between the two feature maps (similarity of the two feature maps) and makes a comparison. More specifically, the feature amount comparing unit 101*d* performs processing based on the matrix product of the two feature maps and calculates the corresponding points between the two feature maps. However, this embodiment is not limited to the comparison method using the processing based on the matrix product of the feature maps. For example, classical feature amounts such as SIFT, SURF, and HoG, that have been used for alignment may be used. Alternatively, the feature map may be shifted by the subpixel in the lateral direction and then subtracted for each pixel for comparison. Alternatively, the feature maps may be concatenated and processed by a fourth neural network for comparison.

Next, in the step S104, the image reconstructing unit 101*e* generates an estimated patch (output image) 202 using the second neural network based on the information (second feature amount) on the corresponding points between the two-viewpoint patches. The estimated patch 202 is an estimation (estimated image) of the other viewpoint patch (second image) 200 obtained from the two-viewpoint patches (two first images) 201.

This embodiment inputs information (second feature amount) on the corresponding points between the two-view patches into the second neural network, but the present invention is not limited to this example. For example, information on the imaging condition and the viewpoint of the estimated, other viewpoint image may be input into the second neural network together with the information on the corresponding points between the two-viewpoint patches. Here, the imaging condition is the same as that in the step S102. A method of inputting the information on the imaging condition and the viewpoint of the estimated, other viewpoint image into the second neural network is the same as that in the step S102. The information on the corresponding points between the two-viewpoint images may be used to warp the two-viewpoint patches and then input into the second neural network.

In this embodiment, as illustrated in FIG. 1, a first half branched network represents the first neural network, and a second half network represents the second neural network. CN in FIG. 1 represents a convolution layer. In the convolution layer CN, the convolution of the input and the filter and an addition of the bias are calculated, and the result is nonlinearly transformed by the activation function. Each component of the filter and the initial value of the bias are arbitrary, and are determined by random numbers in this embodiment. The activation function can use, for example, ReLU (Rectifier Liner Unit), a sigmoid function, or the like. The multidimensional array output in each layer except the final layer is called a feature map. A skip connection 203 is a shortcut path for synthesizing feature maps output from nonsuccessive layers. The feature map may be synthesized by element-wise summation or by concatenation in the channel direction. In this embodiment, the element-wise summation is adopted.

Reference numeral 204 in FIG. 1 denotes a comparing unit for comparing two feature maps (two first feature quantities) with each other generated from the two-viewpoint patches (two first images) 201, respectively, and corresponds to the function of the feature amount comparing unit 101*d* in FIG. 2. As described above, in this embodiment, the feature map comparison method is a matrix product, but the method is not limited to this example.

An element in a dotted-line frame 205 in FIG. 1 represents a residual block (Residual Block). Although not surrounded by a dotted line, in the first neural network, those modules before and after the residual block are also residual blocks. Similarly, the second neural network includes residual blocks. Thus, a neural network in which residual blocks are stacked is called a residual network, and is widely used for image processing by DL. However, this embodiment is not limited to this example, and other modules may be stacked to form a neural network. For example, an Inception Module can be used in which convolutional layers having different convolution filter sizes and a plurality of obtained feature maps are integrated to form a final feature map. A dense block having a dense skip connection may be used.

The processing load (number of convolutions) may be reduced by downsampling the feature maps in the layers close to the input and upsampling the feature maps in the layers close to the output so as to reduce the size of the feature map in the intermediate layer. Downsampling the feature map can use pooling, strided convolution, inverse pixel shuffle, or the like. Upsampling the feature map can use a deconvolution or transposed Convolution, pixel shuffle, interpolation, or the like.

Next, in the step S105 in FIG. 4, the learning unit 101*f* updates the weight of the neural network illustrated in FIG. 1 using an error between the other viewpoint patch (second image) 200 and its estimated patch (output image or estimated image) 202. The weight includes the filter component and bias of each layer. The backpropagation method is used to update the weight, but this embodiment is not limited to this example. The mini batch learning finds the error between the plurality of other viewpoint patches 200 and the estimated patches 202 corresponding to them, and updates the weight. The error function (Loss function) may use, for example, the L2 norm or the L1 norm. The weight updating method (learning method) is not limited to mini batch learning, and may use batch learning or online learning. Only the second neural network may be trained using the weight of the first neural network learned previously. That is, the weight of the first neural network may be fixed without learning, and only the second neural network may be learned. Alternatively, only the first neural network may be learned. Although not illustrated in FIG. 1, when the third neural network is used in the step S102, its weight is also updated at the same time. This is similarly applied when the fourth neural network is used in the step S103.

Next, in the step S106, the learning unit 101*f* determines whether or not the weight learning has been terminated. The termination can be determined by determining whether the number of iterations of learning (weight updates) has reached a specified value, or whether a weight changing amount during updating is smaller than the specified value. If it is determined that the learning has not yet been terminated, the flow returns to the step S101 to acquire a plurality of new two-viewpoint patches (first images) 201 and the other viewpoint patch (second image) 200. On the other hand, when it is determined that the learning has been terminated, the learning apparatus 101 (learning unit 101*f*) ends the learning and stores the weight information in the memory 101*a*.

Figure 11:
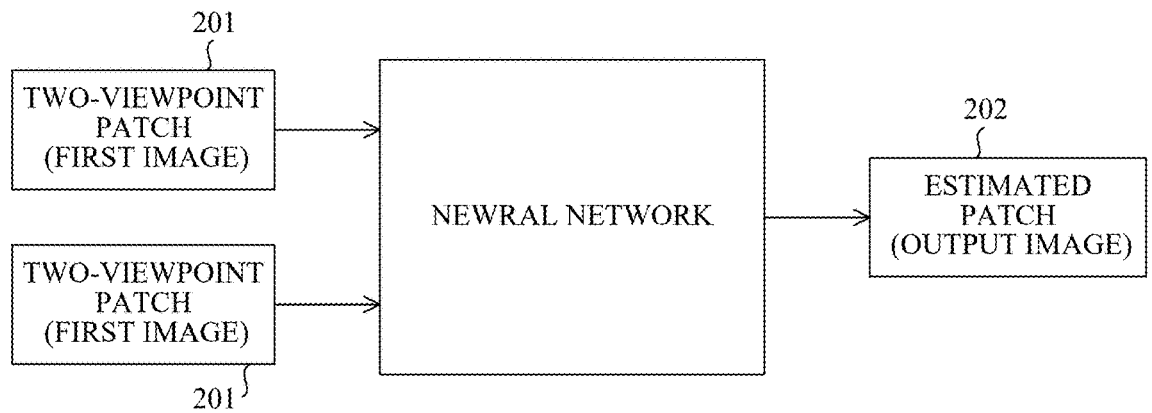
FIG. 11 illustrates a learning flow of a machine learning model according to a modification of each embodiment.
Figure 12:
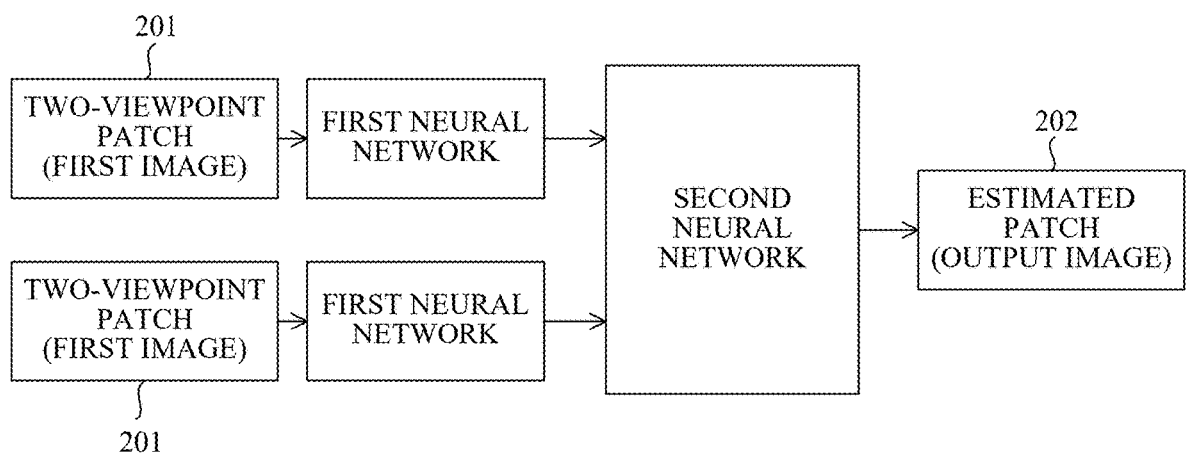
FIG. 12 illustrates a learning flow of a machine learning model according to another modification of each embodiment.

This embodiment uses the configuration illustrated in FIG. 1 as the machine learning model, but the present invention is not limited to this example. For example, the configuration illustrated in FIG. 11 or 12 may be used. FIG. 11 illustrates a learning flow of a machine learning model according to a modification of this embodiment. As illustrated in FIG. 11, a machine learning model may be used in which two-viewpoint patches (two first images) 201 are input into a common neural network to generate an estimated patch (output image) 202. That is, the machine learning model according to this embodiment does not have to be separated into two neural networks like the first neural network and the second neural network. FIG. 12 illustrates a learning flow of a machine learning model according to another modification of this embodiment. As illustrated in FIG. 12, a machine learning model can be used which inputs two outputs from the first neural networks of the two-viewpoint patches (two first images) 201 directly into the second neural network and generates the estimated patch (output image) 202. That is, the machine learning model according to this embodiment does not need to use the comparing unit 204 for comparing the outputs of the first neural networks.

Figure 5:
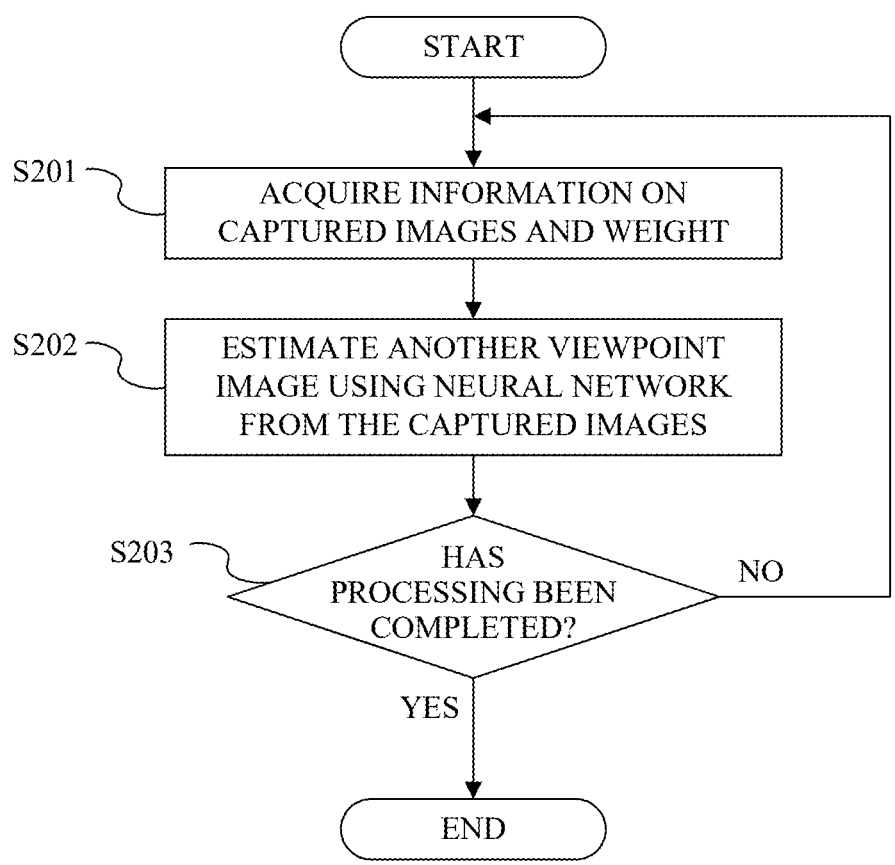
FIG. 5 is a flowchart relating to an estimation of another viewpoint images according to each embodiment.

Referring now to FIG. 5, a description will be given of an estimation of the other viewpoint image executed by the image estimating apparatus 103 in this embodiment. FIG. 5 is a flowchart relating to the estimation of the other viewpoint image. Each step in FIG. 5 is mainly executed by the acquisition unit 103b and the image processing unit 103c in the image estimating apparatus 103.

First, in the step S201, the acquisition unit 103b acquires information on the captured images and weight. The captured images are two-viewpoint images similar to learning, and transmitted from the image pickup apparatus 102 in this embodiment. The weight information is transmitted from the learning apparatus 101 and stored in the memory 103a. When the information on the imaging condition and the viewpoint of the estimated, other viewpoint image in the step S102 in FIG. 4 is input to the first neural network together with the first image, the information is also acquired. The imaging condition is transmitted from the image pickup apparatus 102 together with the captured images and stored in the memory 103a. The information on the viewpoint of the other viewpoint image to be estimated is input by the user, for example, from the input apparatus 106a, and is stored in the memory 103a.

Next, in the step S202, the image processing unit 103c inputs the captured images into the neural network to which the acquired weight information is applied, and estimates the other viewpoint image. Here, the other viewpoint image is an estimated image captured at one or more viewpoints different from that of the captured images. A neural network similar to the configuration illustrated in FIG. 1 can be used to estimate the other viewpoint image. In inputting the captured images into the neural network, it is unnecessary to cut it out to the same size as that of the two-viewpoint patch used during learning, but in order to accelerate the processing, the captured image may be decomposed into multiple patches that overlap each other and processed. In this case, the patches obtained after the processing may be fused to form another viewpoint image.

As described above, the image estimating apparatus 103 according to this embodiment has an acquisition unit 103b and an image processing unit 103c. The acquisition unit 103b acquires two first images made by capturing the same object at two different viewpoints. The image processing unit 103c inputs the two first images into the machine learning model and estimates a second image at one or more viewpoints different from the two viewpoints. The learning apparatus 101 according to this embodiment has an image generating unit 101b and a learning unit 101f. The image generating unit 101b generates two first images made by capturing the same object at two different viewpoints and a second image at one or more viewpoints different from the two viewpoints. The learning unit 101f inputs two first images into the machine learning model, compares the output image and the second image with each other, and learns the machine learning model.

In this embodiment, the learning apparatus 101 and the image estimating apparatus 103 are separate members as an example, but the present invention is not limited to this example, and the learning apparatus 101 and the image estimating apparatus 103 may be integrated with each other. That is, a single device may perform learning (processing illustrated in FIG. 4) and an estimation (processing illustrated in FIG. 5).

The configuration according to this embodiment can provide an image processing apparatus that robustly estimates another viewpoint image of a rectangular-shaped object in the two-viewpoint images having a disparity in the lateral direction.

Second Embodiment

Next follows a description of an image processing system according to a second embodiment of the present invention. In this embodiment, similar to the first embodiment, DL image processing for estimating another viewpoint image from two-viewpoint images is learned and executed using a neural network. The image processing system according to this embodiment is different from that of the first embodiment in that the image pickup apparatus acquires captured images (two-viewpoint images) and performs image processing.

Figure 6:
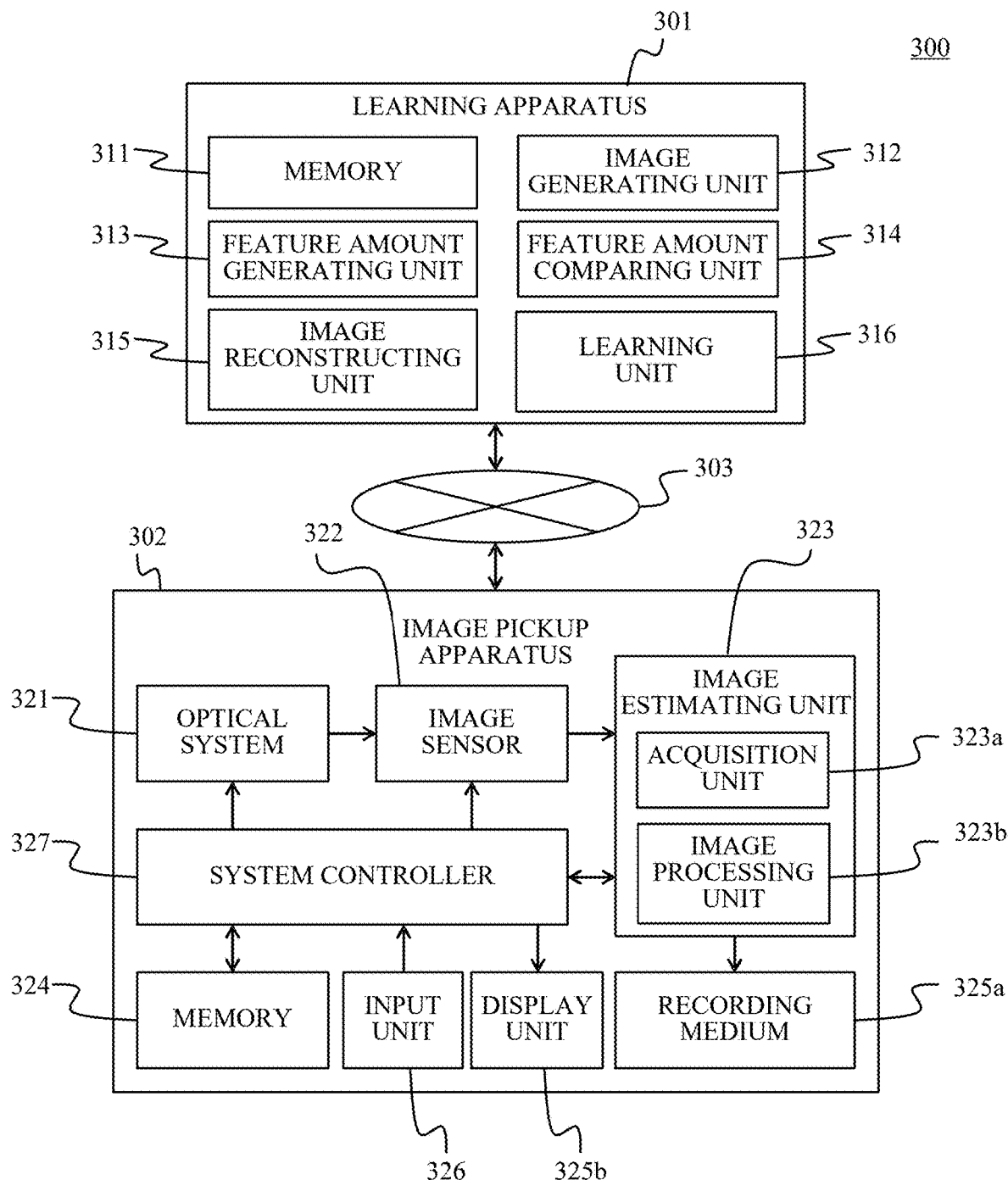
FIG. 6 is a block diagram of an image processing system according to a second embodiment.
Figure 7:
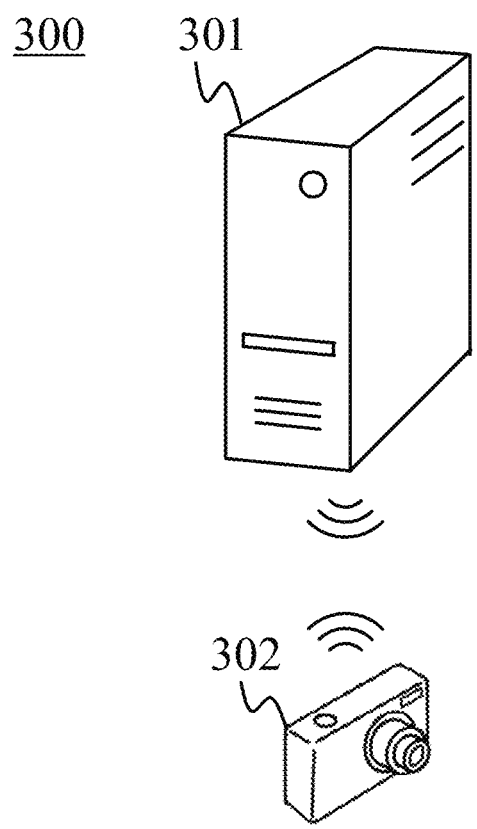
FIG. 7 is an external view of the image processing system according to the second embodiment.

FIG. 6 is a block diagram of an image processing system 300 according to this embodiment. FIG. 7 is an external view of the image processing system 300. The image processing system 300 includes a learning apparatus (image processing apparatus) 301 and an image pickup apparatus 302 connected the learning apparatus 301 via a network 303. The learning apparatus 301 and the image pickup apparatus 302 do not have to be always connected via the network 303.

The learning apparatus 301 has the same configuration as that of the learning apparatus 101 of the first embodiment. That is, the learning apparatus 301 includes a memory 311, an image generating unit 312, a feature amount generating unit 313, a feature amount comparing unit 314, an image reconstructing unit 315, and a learning unit 316. In this configuration, the learning apparatus 301 learns the weight for performing image processing for estimating another viewpoint image from the two-viewpoint images using the neural network.

The image pickup apparatus 302 captures the object space, acquires captured images (two-viewpoint images), and estimates another viewpoint image from the two-viewpoint images using the read information on the weight. Details of the image processing performed by the image pickup apparatus 302 will be described later. The image pickup apparatus 302 includes an optical system (imaging optical system) 321 and an image sensor 322. The image estimating unit 323 has an acquisition unit 323a and an image processing unit 323b, and estimates another viewpoint image from the two-viewpoint images using the weight information stored in the memory 324. Since learning of the weight for the neural network executed by the learning apparatus 301 is the same as that of the first embodiment, a description thereof will be omitted, and only a description of the image processing executed by the image pickup apparatus 302 will be described later in detail.

The weight information is learned in advance by the learning apparatus 301 and stored in the memory 311. The image pickup apparatus 302 reads the weight information out of the memory 311 via the network 303 and stores it in the memory 324. The estimated, other viewpoint image is stored in the recording medium 325a. When the user gives an instruction regarding the display of the estimated, other viewpoint image, the saved image (estimated, other viewpoint image) is read out and displayed on the display unit 325b. The captured images (two-viewpoint images) already stored in the recording medium 325a may be read out, and the image estimating unit 323 may estimate the other viewpoint image. When the instruction is given by the user, a refocused image may be generated from the estimated, other viewpoint image. The above series of control is performed by the system controller 327.

Next follows a description of the estimation of the other viewpoint image executed by the image estimating unit 323 in this embodiment. The procedure of image processing is the same as that of FIG. 5 in the first embodiment. Each step of image processing is mainly executed by the acquisition unit 323a or the image processing unit 323b in the image estimating unit 323.

First, in the step S201, the acquisition unit 323a acquires the captured images (two-viewpoint images) and the weight information. The two-viewpoint images have already been acquired by the image pickup apparatus 302 and stored in the memory 324. The weight information has already been transmitted from the learning apparatus 301 and stored in the memory 324.

Next, in the step S202, the image processing unit 323b inputs the captured images (two-viewpoint images) into the neural network to which the acquired weight is applied, and estimates the other viewpoint image. A neural network similar to the configuration illustrated in FIG. 1 can be used for estimating the other viewpoint image.

Due to the above configuration, this embodiment can provide an image processing system that robustly estimates another viewpoint image of a rectangular-shaped object in the two-viewpoint images having a disparity in the lateral direction.

Third Embodiment

Next follows a description of the image processing system according to a third embodiment of the present invention. The image processing system according to this embodiment is different from the image processing systems according to the first and second embodiments in including a processing apparatus (computer) that transmits the captured images (two-viewpoint images) that are targets to be image-processed to an image estimating apparatus and receives another viewpoint image estimated from the two-viewpoint images from the image estimating apparatus.

Figure 8:
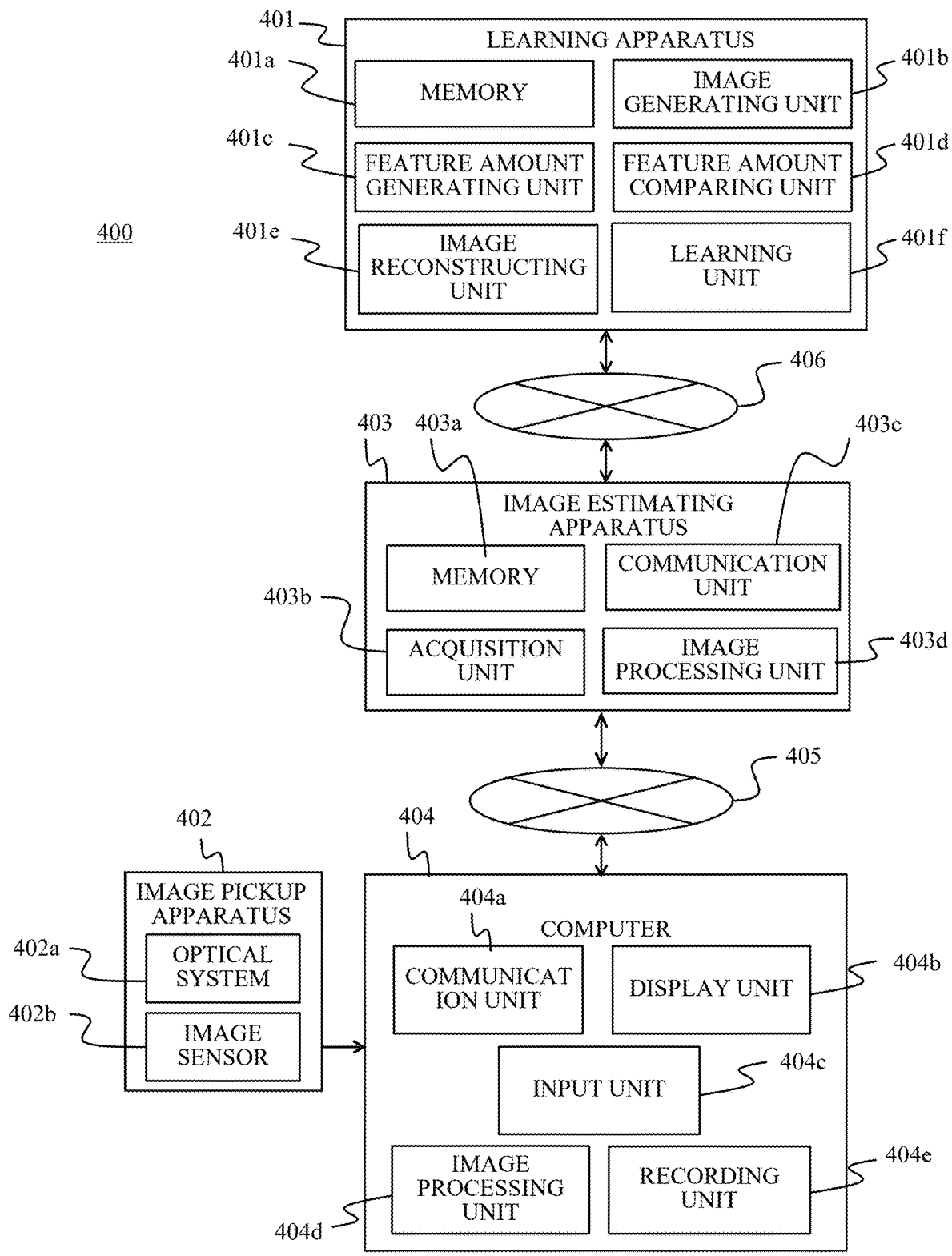
FIG. 8 is a block diagram of an image processing system according to a third embodiment.

FIG. 8 is a block diagram of an image processing system 400 according to this embodiment. The image processing system 400 includes a learning apparatus 401, an image pickup apparatus 402, an image estimating apparatus (second device) 403, and a computer (processing apparatus, first device) 404. The learning apparatus 401 and the image estimating apparatus 403 are, for example, servers. The computer 404 is, for example, a user terminal (personal computer or smartphone). The computer 404 is connected to the image estimating apparatus 403 via the network 405. The image estimating apparatus 403 is connected to the learning apparatus 401 via the network 406.

The computer 404 and the image estimating apparatus 403 are communicable with each other, and the image estimating apparatus 403 and the learning apparatus 401 are communicable with each other. Since the configurations of the learning apparatus 401 and the image pickup apparatus 402 are the same as those of the learning apparatus 101 and the image pickup apparatus 102 of the first embodiment, a description thereof will be omitted.

The image estimating apparatus 403 includes a memory 403a, an acquisition unit 403b, a communication unit (receiver) 403c, and an image processing unit 403d. The memory 403a, the acquisition unit 403b, and the image processing unit 403d are the same as the memory 103a, the acquisition unit 103b, and the image processing unit 103c in the image estimating apparatus 103 according to the first embodiment, respectively. The communication unit 403c serves to receive a request transmitted from the computer 404 and to transmit the other viewpoint image estimated by the image estimating apparatus 403 to the computer 404.

The computer 404 includes a communication unit (transmitter) 404a, a display unit 404b, an input unit 404c, an image processing unit 404d, and a recording unit 404e. The communication unit 404a serves to transmit a request for causing the image estimating apparatus 403 to perform processing for the captured images (two first images and two-viewpoint images) to the image estimating apparatus 403, and to receive the output image (other viewpoint image) estimated by the image estimating apparatus 403. The display unit 404b serves to display various information. The information displayed on the display unit 404b includes, for example, the captured images (two-viewpoint images) transmitted to the image estimating apparatus 403, another viewpoint image received from the image estimating apparatus 403, and a refocused image (third image) generated from the other viewpoint image. The input unit 404c inputs an instruction from the user. The image processing unit 404d serves to receive the other viewpoint image estimated by the image estimating apparatus 403 and to perform image processing for the other viewpoint image. The image processing applicable to the estimated, other viewpoint image includes refocus processing and the like. The recording unit 404e records the captured images acquired from the image pickup apparatus 402, the output image received from the image estimating apparatus 403, and the like.

Figure 9:
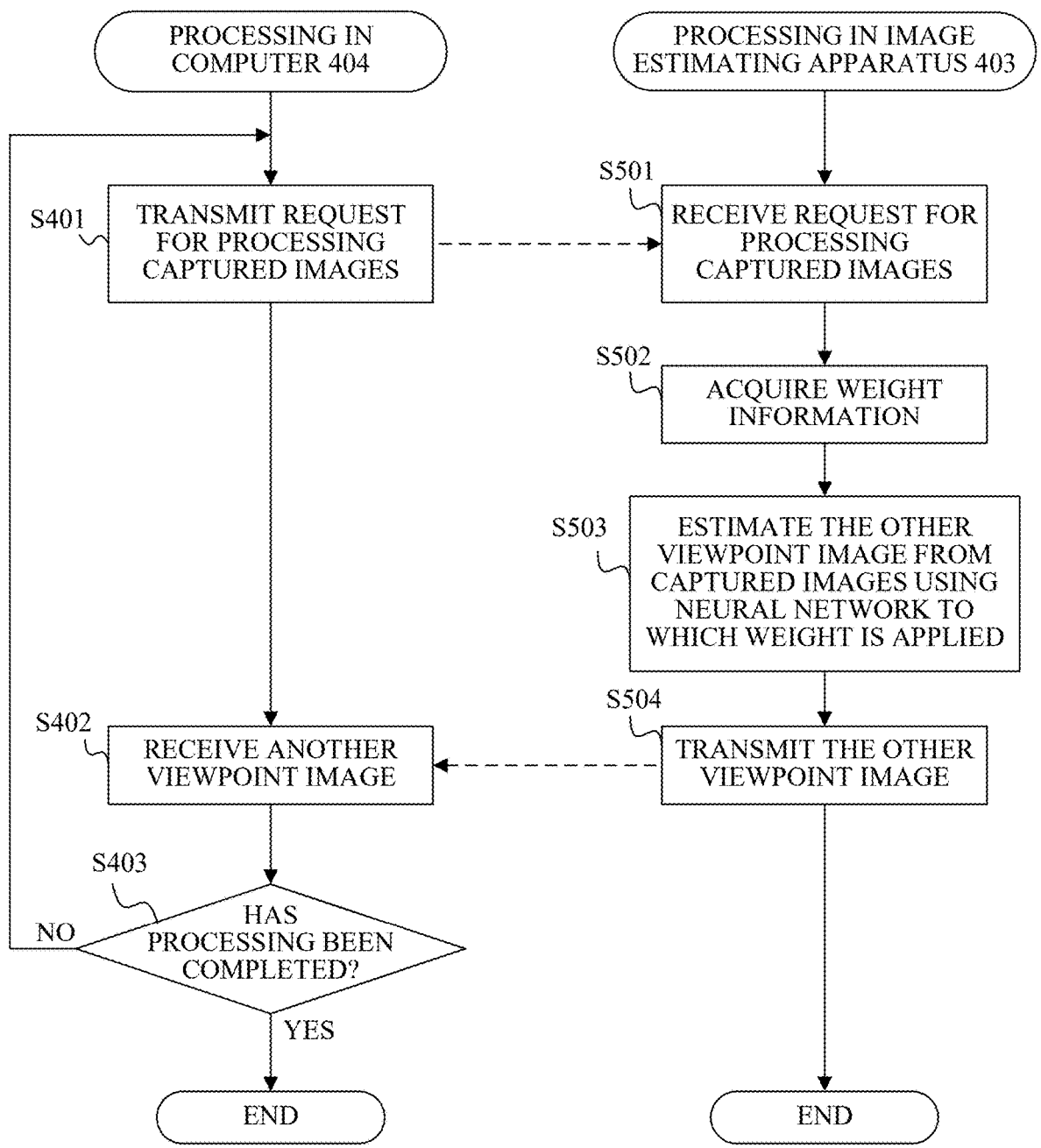
FIG. 9 is a flowchart relating to an estimation of another viewpoint image according to the third embodiment.

Referring now to FIG. 9, a description will be given of the image processing according to this embodiment. FIG. 9 is a flowchart relating to the estimation of the other viewpoint image in this embodiment. The image processing in this embodiment is equivalent to the image processing (FIG. 5) described in the first embodiment. The image processing illustrated in FIG. 9 is started when the user gives an instruction to start the image processing via the computer 404.

A description will now be given of the operation of the computer 404. First, in the step S401, the computer 404 transmits a processing request for the captured images (two-viewpoint images) to the image estimating apparatus 403. A method of transmitting the two-viewpoint images to be processed to the image estimating apparatus 403 is not limited. For example, the two-viewpoint images may be uploaded to the image estimating apparatus 403 at the same time as the step S401 or prior to the step S401. The two-viewpoint images may be images stored on a server different from the image estimating apparatus 403. In the step S401, the computer 404 may transmit an ID for authenticating the user, an imaging condition, information on the viewpoint of the other viewpoint image to be estimated, and the like, as well as the processing request for the two-viewpoint images. Next, in the step S402, the computer 404 receives the other viewpoint image estimated by the image estimating apparatus 403.

Next follows a description of the operation of the image estimating apparatus 403. First, in the step S501, the image estimating apparatus 403 receives the processing request for the captured images (two-viewpoint images) transmitted from the computer 404. The image estimating apparatus 403 determines that the processing for the two-viewpoint images has been instructed and executes the processing subsequent to the step S502.

Next, in the step S502, the image estimating apparatus 403 acquires weight information. The weight information is information (learned model) learned by the same method as that of the first embodiment (FIG. 4). The image estimating apparatus 403 may acquire weight information from the learning apparatus 401, or weight information that has been previously acquired from the learning apparatus 401 and stored in the memory 403a. The subsequent step S503 is the same as the step S202 of the first embodiment. Next, in the step S504, the image estimating apparatus 403 transmits the estimated, other viewpoint image to the computer 404.

As discussed, the image estimating apparatus 403 may be controlled with the computer 404 communicatively connected to the image estimating apparatus 403 as in this embodiment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

When estimating another viewpoint image from two-viewpoint images having a disparity in the lateral direction using a machine learning DL, each embodiment can robustly estimate the other viewpoint image of a rectangular-shaped object in the two-viewpoint images. Therefore, each embodiment can provide an image processing apparatus, an image processing method, a storage medium, a method for manufacturing a learned model, and an image processing system, each of which can estimate another viewpoint image from the two-viewpoint images with high accuracy.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-103809, filed on Jun. 16, 2020 which is hereby incorporated by reference herein in its entirety.

What is claimed is:

1. An image processing apparatus comprising:
an image sensor including a plurality of pixels, with two light-receiving units only in each of the plurality of pixels, and an optical system that forms images of different viewpoints on the only two light-receiving units in each of the plurality of pixels; and
at least one processor or circuit configured to execute a plurality of tasks including:
an acquisition task configured to acquire (i) two first images made by capturing the same object at two viewpoints separated from each other in a first direction using the image sensor including the only two light-receiving units in each of the plurality of pixels and the optical system that forms the images of the different viewpoints on the only two light-receiving units in each of the plurality of pixels and (ii) an imaging condition associated with the two first images and including both of a focal length of the optical system and an ISO speed of the image sensor;
a feature amount generating task configured to generate two first feature amounts by inputting the two first images, the focal length of the optical system, and the ISO speed of the image sensor into a first neural network in a machine learning model;
a comparing task configured to generate a second feature amount by calculating corresponding points of the two first feature amounts through processing based on a matrix product of the two first feature amounts; and
an image processing task configured to estimate a second image at a viewpoint different from the two viewpoints by inputting the second feature amount into a second neural network in the machine learning model,
wherein the viewpoint different from the two viewpoints is shifted in a second direction orthogonal to the first direction, and
wherein, in the image processing task, an image at a viewpoint other than the two viewpoints is not input into the machine learning model in estimating the second image.

2. The image processing apparatus according to claim 1, wherein the two first images are respectively input to two first neural networks having the same network architecture and weight as each other.

3. The image processing apparatus according to claim 1, wherein the image processing task generates a third image that has an in-focus position changed from that of the second image.

4. An image processing method comprising:
an acquisition step of acquiring (i) two first images made by capturing the same object at two viewpoints separated from each other in a first direction using an image sensor including a plurality of pixels, with two light-receiving units only in each of the plurality of pixels, and an optical system that forms images of different viewpoints on the only two light-receiving units in each of the plurality of pixels and (ii) an imaging condition associated with the two first images and including both of a focal length of the optical system and an ISO speed of the image sensor;

a feature amount generating step of generating two first feature amounts by inputting the two first images, the focal length of the optical system, and the ISO speed of the image sensor into a first neural network in a machine learning model;

a comparing step of generating a second feature amount by calculating corresponding points of the two first feature amounts through processing based on a matrix product of the two first feature amounts; and an image processing step of estimating a second image at a viewpoint different from the two viewpoints by inputting the second feature amount into a second neural network in the machine learning model, wherein the viewpoint different from the two viewpoints is shifted in a second direction orthogonal to the first direction, and wherein, in the image processing task, an image at a viewpoint other than the two viewpoints is not input into the machine learning model in estimating the second image.

5. A non-transitory computer-readable storage medium storing a computer program that causes a computer to execute the image processing method comprising:

an acquisition step of acquiring (i) two first images made by capturing the same object at two viewpoints separated from each other in a first direction using an image sensor including a plurality of pixels, with two light-receiving units only in each of the plurality of pixels, and an optical system that forms images of different viewpoints on the only two light-receiving units in each of the plurality of pixels and (ii) an imaging condition associated with the two first images and including both of a focal length of the optical system and an ISO speed of the image sensor;

a comparing step of generating a second feature amount by calculating corresponding points of the two first feature amounts through processing based on a matrix product of the two first feature amounts; and an image processing step of estimating a second image at a viewpoint different from the two viewpoints by inputting the second feature amount into a second neural network in the machine learning model, wherein the viewpoint different from the two viewpoints is shifted in a second direction orthogonal to the first direction, and wherein, in the image processing task, an image at a viewpoint other than the two viewpoints is not input into the machine learning model in estimating the second image.

6. An image processing system including an image processing apparatus and a control apparatus that is capable of communicating with the image processing apparatus, the image processing apparatus comprising:

an image sensor including a plurality of pixels, with two light-receiving units only in each of the plurality of pixels, and an optical system that forms images of different viewpoints on the only two light-receiving units in each of the plurality of pixels; and at least one processor or circuit configured to execute a plurality of tasks including:

an acquisition task configured to acquire (i) two first images made by capturing the same object at two viewpoints separated from each other in a first direction using the image sensor including the only two light-receiving units in each of the plurality of pixels and the optical system that forms the images of the different viewpoints on the only two light-receiving units in each of the plurality of pixels and (ii) an imaging condition associated with the two first images and including both of a focal length of the optical system and an ISO speed of the image sensor;

a feature amount generating task configured to generate two first feature amounts by inputting the two first images, the focal length of the optical system, and the ISO speed of the image sensor into a first neural network in a machine learning model;

a comparing task configured to generate a second feature amount by calculating corresponding points of the two first feature amounts through processing based on a matrix product of the two first feature amounts; and an image processing task configured to estimate a second image at a viewpoint different from the two viewpoints by inputting the second feature amount into a second neural network in the machine learning model, wherein the viewpoint different from the two viewpoints is shifted in a second direction orthogonal to the first direction, and wherein, in the image processing task, an image at a viewpoint other than the two viewpoints is not input into the machine learning model in estimating the second image;

wherein the control apparatus transmits a request for executing a process on the two first images, and wherein the image processing apparatus executes the process on the two first images based on the request.

7. The image processing apparatus according to claim 1, wherein the acquired imaging condition associated with the two first images further includes an aperture of the optical system and a pixel pitch of the image sensor, and wherein the aperture of the optical system and the pixel pitch of the image sensor are input together with the two first images, the focal length of the optical system, and the ISO speed of the image sensor to the first neural network to generate the two first feature amounts.

* * * * *